United States Patent
Richardt et al.

(10) Patent No.: US 8,756,489 B2
(45) Date of Patent: Jun. 17, 2014

(54) METHOD AND SYSTEM FOR DYNAMIC ASSEMBLY OF FORM FRAGMENTS

(75) Inventors: Jocelyn Richardt, River Falls, WI (US); John P. Brinkman, Ontario (CA); Donald R. Walling, Jr., San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 855 days.

(21) Appl. No.: 12/561,817

(22) Filed: Sep. 17, 2009

(65) Prior Publication Data

US 2014/0033010 A1    Jan. 30, 2014

(51) Int. Cl.
*G06F 17/00*        (2006.01)
*G06F 17/22*        (2006.01)
*G06F 17/24*        (2006.01)

(52) U.S. Cl.
CPC ......... *G06F 17/2229* (2013.01); *G06F 17/248* (2013.01); *G06F 17/243* (2013.01)
USPC ............ 715/222; 715/234; 715/221; 715/255

(58) Field of Classification Search
USPC ................................. 715/221–226, 255, 234
See application file for complete search history.

(56) References Cited

U.S. PATENT DOCUMENTS

| | | | | |
|---|---|---|---|---|
| 6,769,095 B1* | 7/2004 | Brassard et al. | ............. | 715/234 |
| 7,152,055 B2* | 12/2006 | Loschky et al. | ...................... | 1/1 |
| 7,254,571 B2* | 8/2007 | Brown et al. | ......................... | 1/1 |
| 7,451,393 B1* | 11/2008 | Herbison et al. | ............. | 715/234 |
| 7,734,995 B1* | 6/2010 | Saikaly | ......................... | 715/200 |
| 7,886,222 B2* | 2/2011 | Bagare et al. | ................. | 715/234 |
| 8,055,997 B2* | 11/2011 | Gagnon | ........................ | 715/222 |
| 2001/0013045 A1* | 8/2001 | Loschky et al. | ............... | 707/530 |
| 2003/0018481 A1* | 1/2003 | Zhou et al. | ........................ | 705/1 |
| 2003/0055871 A1* | 3/2003 | Roses | ........................... | 709/203 |
| 2004/0036719 A1* | 2/2004 | Van Treeck | .................... | 345/763 |
| 2005/0120298 A1* | 6/2005 | Petrujkic | ....................... | 715/511 |
| 2006/0095542 A1* | 5/2006 | Reddy et al. | .................. | 709/217 |
| 2006/0253489 A1* | 11/2006 | Kahn et al. | .................... | 707/102 |
| 2006/0259524 A1* | 11/2006 | Horton | .......................... | 707/201 |
| 2006/0288270 A1* | 12/2006 | Gaurav et al. | ................. | 715/506 |

(Continued)

OTHER PUBLICATIONS

Adobe, "Assembler Service and DDX Reference", Adobe® LiveCycle® ES2, Jan. 2010, 357 pages.*

(Continued)

*Primary Examiner* — Laurie Ries
*Assistant Examiner* — Benjamin Smith
(74) *Attorney, Agent, or Firm* — Schwegman Lundberg & Woessner, P.A.

(57) ABSTRACT

A system for dynamic assembly of form fragments is provided. The system may reside on a computer system hosting a computing application and may include a request processor be configured to receive a request to generate an electronic form based on a host template and a document description, an insertion points processor, a stitching module, and an output module. The insertion points processor may be configured to parse the host template to determine an insertion point and determine a form fragment to be referenced in the host template at a location designated by the insertion point, based on information present in the document description. The stitching module may be configured to insert a reference to the form fragment into the host template at the location indicated by the insertion point. The output module may be configured to generate a result electronic form, utilizing the host template and the form fragment.

17 Claims, 7 Drawing Sheets

(56) References Cited

U.S. PATENT DOCUMENTS

| | | | |
|---|---|---|---|
| 2007/0046996 A1* | 3/2007 | Matsuda | 358/1.18 |
| 2007/0078805 A1* | 4/2007 | Reddy et al. | 707/1 |
| 2007/0147610 A1* | 6/2007 | Kethi Reddy | 380/229 |
| 2008/0046806 A1* | 2/2008 | Reddy et al. | 715/221 |
| 2008/0098918 A1* | 5/2008 | Rees et al. | 101/483 |
| 2008/0126396 A1* | 5/2008 | Gagnon | 707/102 |
| 2008/0155394 A1* | 6/2008 | Sellman et al. | 715/235 |
| 2009/0210780 A1* | 8/2009 | Oshima | 715/234 |

OTHER PUBLICATIONS

Seth Reilly, LiveCycle Espresso, "Adobe LiveCycle applications that can be developed in the time it takes to brew a shot of espresso", "LiveCycle Assembler DDX cookware", Aug. 6, 2008, 6 pages.*

Jeff Chastain, "Using DDX to unlock the potential of PDF manipulation in ColdFusion 8", Sep. 17, 2007, 6 pages.*

* cited by examiner

METHOD AND SYSTEM FOR DYNAMIC ASSEMBLY OF FORM FRAGMENTS

TECHNICAL FIELD

This disclosure relates generally to the technical fields of software and/or hardware technology and, in one example embodiment, to a system and method for dynamic assembly of form fragments.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

From the very beginning of written expression, documents have been an important part of various business, political and personal transactions. Technology advances have led to improved methods of document processing. For example, the application of computer systems to document processing has made document creation, editing, management and distribution easier than ever before. For example, a forms package may be electronically created, edited, and distributed.

Electronic forms (referred to as "forms") are used to collect information in almost every business or government agency. Depending upon the input data provided to the electronic form (e.g., from an end user or from a processing application) the electronic form may have some of its fields or sections left blank or, conversely, may require additional information.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
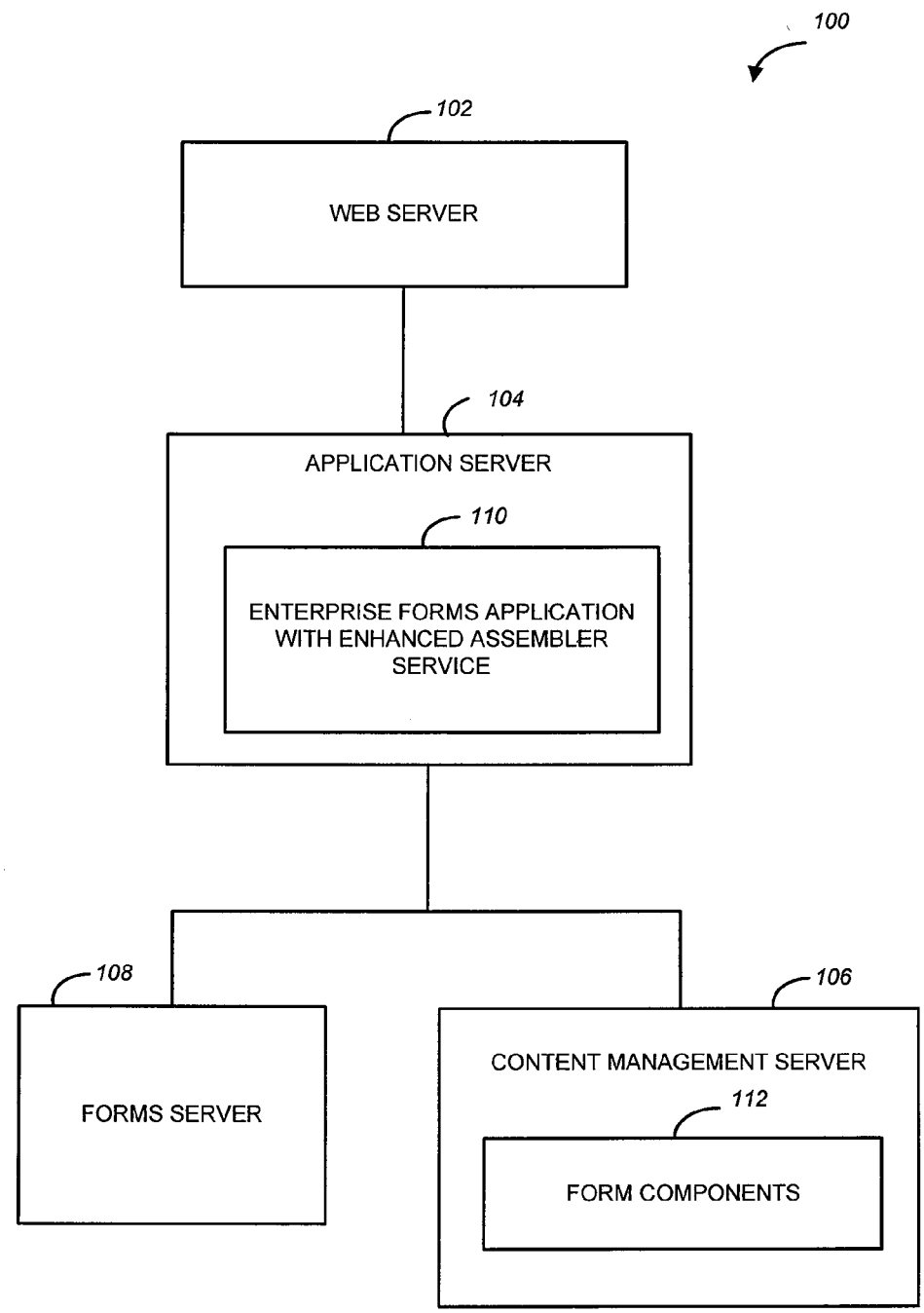
FIG. 1 is a block diagram illustrating a server configuration within which a method and system for dynamic assembly of form fragments may be implemented, according to an example embodiment

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

An electronic form may, in many cases, embody a complex "application packaged as a document" that may utilize a template-based grammar where the template associated with an electronic form defines presentation, calculations and interaction rules, while the content of the electronic form comprises the application data of the user. Though they are often packaged together, a template and the content of an electronic form may be separate entities. In order to load an electronic form, the template associated with the electronic form may be merged with custom data such as form field values that are mapped to the respective fields in the template.

In some scenarios, it may be practical to save certain portions of a form template as separate data units, such that these portions can be included into various different templates. For example, when a company logo is saved as a separate unit (referred to as a form fragment), it can be included into any form template by inserting into a template a reference to the fragment that represents the company logo. The process of assembling a form template by referencing form fragments may be referred to as stitching. When the fragment representing the company logo is updated, any form generated based on a template that has a reference to the logo fragment would include the updated version of the logo. For the purposes of this disclosure, a form fragment (or merely fragment) will refer to a reusable part of an electronic form that is saved as a separate file and that can be referenced in multiple form templates. A form fragment could represent a small portion of a template, e.g., an address block, or it could represent multiple pages of text and graphics (e.g., a text related to a waiver of liability).

A computerized system for generating and processing electronic forms may include an assembler service configured to manipulate electronic documents in various ways, including inserting references to form fragments that may represent various content, such as headers, footers, and a table of contents. A job submitted to the assembler service may include a document description file and one or more of source documents that may be in a portable document format (PDF) or in extensible markup language (XML). The contents of the document description file (referred simply as document description) provides instructions on how to use the source documents in order to produce a set of result documents. In one embodiment, document description may be written using XML-based language called Document Description XML (DDX). DDX is a declarative mark-up language that allows defining form elements that represent building blocks of electronic documents. These building blocks may include PDF pages and other elements of electronic documents such as form fragments representing, e.g., comments, bookmarks, and styled text. DDX instructions can also describe output formats that represent data extracted from electronic documents or provide information about the properties of an electronic document.

In some applications, a form template may be assembled with data at a server system based on certain requirements for a particular use case, and then sent to the client system as an interactive electronic form or as a print document. The process of assembling the template with data, utilizing fragments, may be performed according to predetermined hard-coded instructions. An approach utilizing dynamic assembly may be used advantageously when the result electronic form assembled in response to a specific customer scenario may include multiple possible combinations of fragments. For example, consider an insurance renewal form that may include "Terms and Conditions" language that differs from state to state and also may need to be provided in English or in Spanish. Adding further variables, such as allowing the form to be used for collection of information regarding up to five insured vehicles using up to five "vehicle information" form fields further increases the complexity of the assembly process.

In one example embodiment, utilizing an approach of dynamic assembly of form fragments, an assembler service may be provided at a server system that receives a form template that defines a blank insurance renewal form, a file (termed document description file) containing instructions on how the resulting form is to be assembled, and user data. The form template that defines a blank insurance renewal form is referred to as a host form template, as the result electronic form may be produced based on this form template after it has been populated with references to various form fragments according to instructions provided in the document description file. The assembler service, which is described in more detail further below, may be configured to examine the host form template, examine the document description file and the user data, and determine which form fragments should be included in the result electronic form. With respect to the example above, describing an insurance renewal form, the assembler service may determine whether one or more form fragments corresponding to the fields for receiving information related to each of the insured vehicles are to be included in the result electronic form.

One embodiment of dynamic assembly of form fragments may be described as a way to dynamically include form content into a form template in order to create a new template that would be used for rendering the result electronic form. Form content may be form fragments or entire forms. In some embodiments, a form template may be designed to include fragment insertion points that mark respective locations in the form template where references to form fragments are to be placed. The operation of inserting a reference to a form fragment at a location in a form template indicated by a fragment insertion point may be referred to as populating the insertion point.

In one example embodiment, the assembler service may be configured to determine that populating the host form template with one or more references to form fragments may result in altering the pagination of the host template and automatically updating pagination of the populated host template. In some embodiments, a system for dynamic assembly of form fragments may be configured to permit defining a dynamic assembly process in a hierarchy. Source form fragments may be assembled into a result form fragment that, in turn, may be included by the assembler service into the host form template.

In one embodiment, the DDX language, which supports the specification of form templates and form content to be inserted in the template, may be enhanced to allow specifying parameters of the dynamic assembly process. Form fragments can be specified as variables, files, or references. A form fragment may contain an entire form document or a form element as defined by an associated forms editor. Enhanced DDX specification, in one example embodiment, supports nesting of form fragments, such that any form fragment may also be a form template, in which references to form fragments are inserted. This approach may allow recursive building of electronic forms from any level of fragments.

As mentioned above, the dynamic assembly of form fragments may allow designating a location within the template for insertion of references to respective form fragments. In one embodiment, a forms editor that may be used in conjunction with an assembler service may be configured to designate insertion points in a form template. Such insertion points may also be specified in a DDX file to indicate respective locations in the host template for placement of the references to the associated fragments. A marker specifying the insertion point in a host template may not be linked to any visual representation in the template or it may contain placeholder data and thus be visible to a user. In operation, provided that any required form fragments, an associated document description file, and a host template have been defined, the assembler service detects a triggering event (e.g., a workflow event) and, in response to the detecting of the triggering event, accesses the form fragments indicated by the document description file, and inserts references to these form fragments at the locations designated by the insertion points in the host form template. In one embodiment, the insertion points may be resolved recursively in order to discover any insertion points that may be present in the referenced form fragment.

In an example embodiment, the system for dynamic assembly of form fragments may be implemented in the context of the eXtensible Markup Language (XML) Forms Architecture (XFA) that combines powerful data and business logic capabilities of XML with rich presentation capabilities of Adobe® Portable Document Format (PDF). The Adobe® XML architecture offers support for arbitrary XML, allowing users to leverage existing and industry-standard schemas. Depending on the process requirements, electronic forms can be deployed as PDF or an XML Data Package (XDP) and processed as XML. An XDP packages a PDF file together with XML form and template data.

FIG. 1 is a block diagram illustrating a server configuration 100, according to an example embodiment. In some embodiments, the server configuration 100 includes a web server 102, an application server 104, a content management server 106 and a form server 108. The web server 102 provides a user interface for users to select applications that execute on the application server 104. In an example embodiment, the application server 104 hosts a computing application for providing dynamic form fragments processing. An example of such application is shown in FIG. 1 as an enterprise forms application with enhanced assembler service 110. As mentioned above, the enhanced assembler service may be configured to assess a host form template and an associated documents description file and, based on the result of the assessment, modify the host template by populating one or more insertion points in the host form template with references to respective form fragments, such that the result electronic form generated based on the updated host form template includes content represented by those form fragments. As an example, a computing application provided on the application server 104 may be configured to provide insurance forms for different states where the boilerplate language provided in the forms may reflect regulatory differences in the different states. In order to accommodate this scenario, a single host form template may be provided configured to include an insertion point indicating the location in the host template for inserting a fragment representing a needed template and also the manner in which this insertion point are is to be populated with a reference to a fragments representing the selected boilerplate. When an insurance form is requested from the computing application, the assembler service provided with the computing application may examine the host form template and an associated DDX file, automatically determine which form fragment is to be inserted in the result electronic form and populate the insertion points in the host form template accordingly.

An example using DDX language, shown in Table 1 below, illustrates instructions for inserting a form fragment representing "Terms and conditions" language specific to the state of Alabama into the result electronic form.

TABLE 1

```
<XDP result="final.xdp">
    <XDP source="docin.xdp">
        <XDPContent insertionPoint="TermsAndConditions"
            source="tac.xdp" fragment="Alabama"/>
        </XDPContent>
    </XDP>
</XDP>
```

Content management server 106 provides software that manages components of electronic documents, such as form fragments, form templates, and collections of electronic forms referred to as formsets. In some embodiments, the content management server provides the ability to save and retrieve form fragments, forms, templates and other content. In addition, the content management server 106 may provide the ability to save various versions of the components of electronic documents. Individual components of document components 112 may be files in a file system or objects in a database. Electronic documents and its components may be identified by a path and file name, a URL (Uniform Resource Locator), or by a unique identifier such as a GUID (Globally Unique Identifier). Electronic documents and its components may be organized in varying ways, including separating various components under separate directories or folders in a file system.

The form server 108 may be configured to render electronic forms utilizing form templates and other content sources. In addition, the form server 108 may generate control files and PostScript language files used to fax and/or print electronic documents. In some embodiments, the form server 108 is the Adobe® Form Server product available from Adobe Systems Incorporated.

As mentioned above, the application server 104 may host a computing application for providing dynamic form fragments processing. Example method and system for dynamic assembly of form fragments may be described with reference to a network environment 200 illustrated in FIG. 2. The network environment 200 may include one or more computer systems, such as a client computer system 210 and an application server 240. The client computer system 210 and the application server 240 may be in communication with each other via a communications network 230, utilizing a browser application 221. The communications network 230 may be a public network (e.g., the Internet, a wireless network, a public switched telephone network (PSTN), etc.) or a private network (e.g., LAN, WAN, Intranet, etc.).

Figure 2:
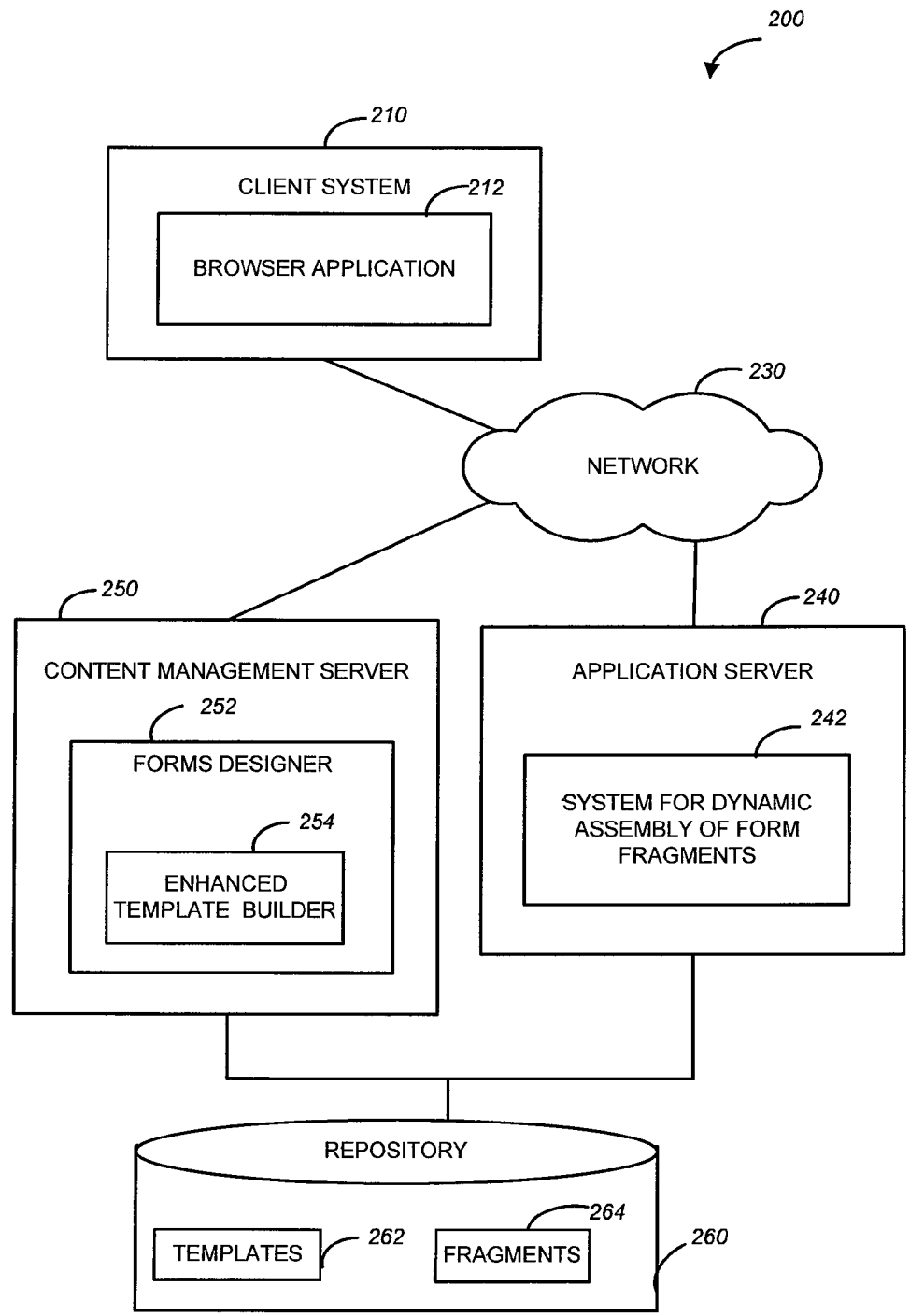
FIG. 2 is a block diagram showing a network environment within which a method and system for dynamic assembly of form fragments may be implemented, in accordance with an example embodiment.

The application server 240, in one embodiment, corresponds to the application server 104 illustrated in FIG. 1. As shown in FIG. 2, the application server 240 hosts a system for dynamic assembly of form fragments 242 that may be configured to dynamically generate result electronic forms with appropriate form fragments based on the specific scenario indicated by a document instructions file and, in some cases, also by the custom data provided to the dynamic assembly of form fragments 242. As mentioned above, after the insertion points in the host form template have been populated with references to form fragments, the result electronic form is generated merging the host form template with any user application data and by pulling the fragments referenced in the host form template into the result electronic form. Form fragments and various templates (identified in FIG. 2 by reference numerals 264 and 262 respectively may be stored in a repository 260.

Also shown in FIG. 2 is a content management server 250. The content management server 250 may host a forms designer 252 configured to create and edit form templates and form fragments. An enhanced template builder 254 provided with the forms designer 252 may be configured to generate templates with one or more insertion points indicating that an electronic form generated based on that template may potentially include form fragments specified by the respective insertion points. The forms designer 252 may be used in conjunction with the system for dynamic assembly of form fragments 242.

Figure 3:
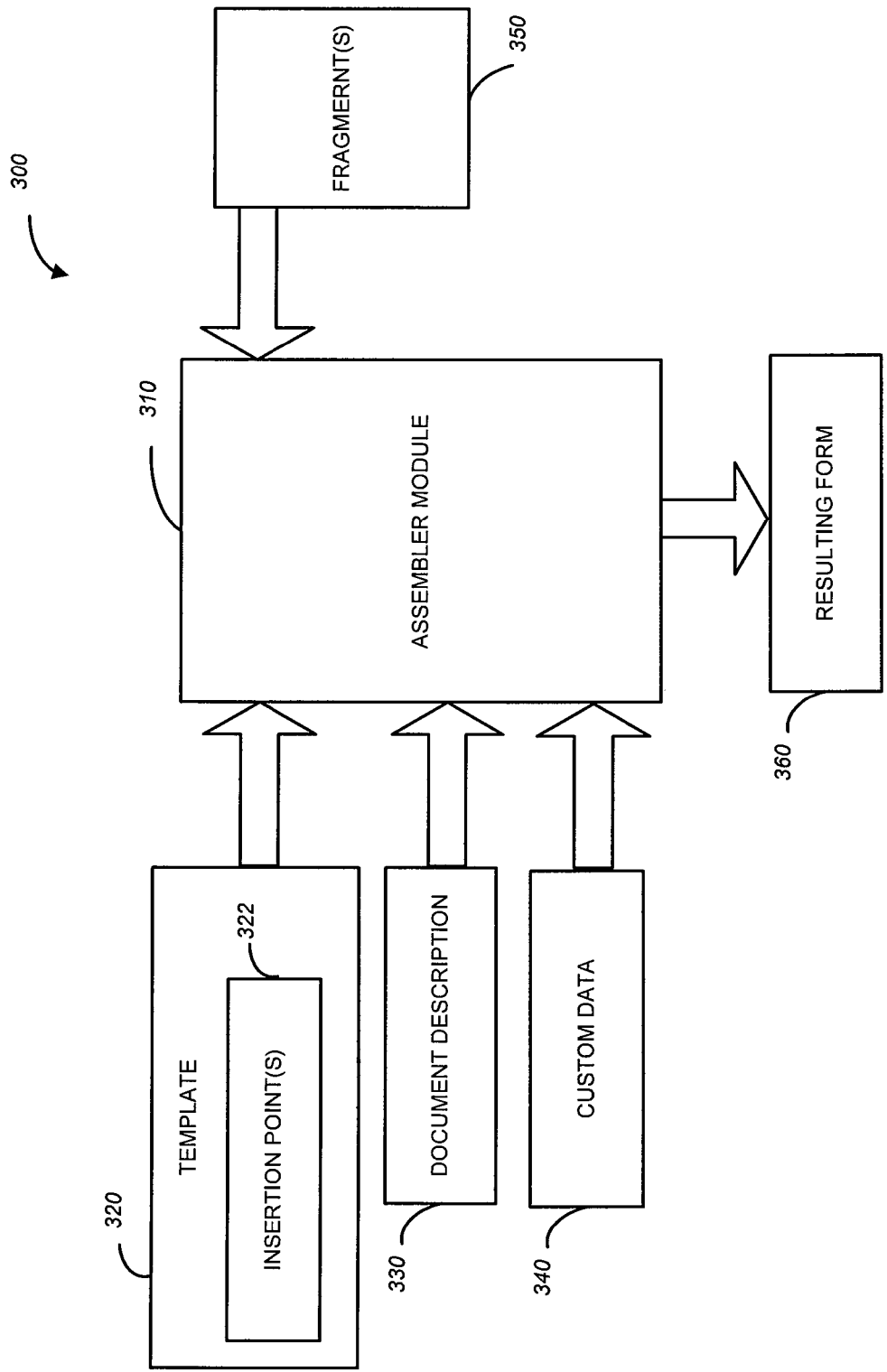
FIG. 3 illustrates example data flow with respect to an assembler service, in accordance with an example embodiment.

FIG. 3 illustrates example data flow 300 with respect to an assembler service, in accordance with an example embodiment. An assembler 310, in one example embodiment, receives a form template 320 with insertion points 322 and a document description 330. Custom data 340 may also be provided. As described above, the template 320, the document description 330, and the custom data 340 may be provided to the assembler 310 together with a request to generate the resulting form 360, in response to a workflow event. The assembler 310 populates the insertion points 322 with references to fragments. The fragments 350 referenced in the form template 320 after it has been processed by the assembler 310 are used by the assembler 310 to generate a resulting form

360. In some embodiments, the assembler 310 may be provided together with an output service (not shown) that performs rendering of the resulting form 360.

Figure 4:
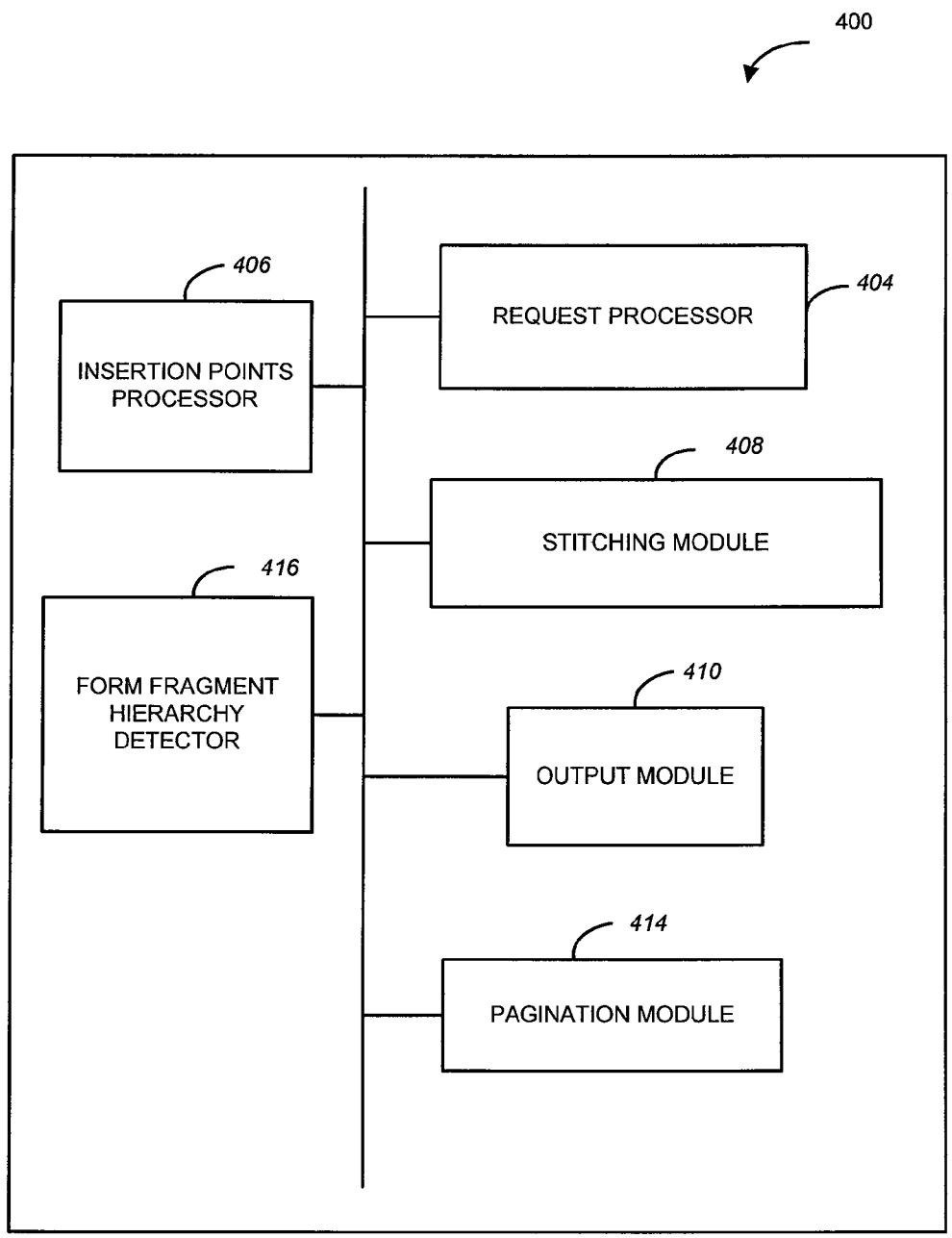
FIG. 4 is a block diagram illustrating a system for dynamic assembly of form fragments, in accordance with an example embodiment.

FIG. 4 is a block diagram illustrating a system 400 for dynamic assembly of form fragments, in accordance with an example embodiment. As shown in FIG. 4, the system 400 includes a request processor 404, an insertion points processor 406, a stitching module 408, and an output module 410. The request processor 404 may be configured to receive a request to generate an electronic form based on a host template and a document description. The insertion points processor 406 may be configured to parse the host template to determine an insertion point and determine a form fragment to be referenced in the host template at a location designated by the insertion point, based on information present in the document description. In some embodiments, the form fragment is determined based on a process variable or a URL present in the document description, or based on custom data. The insertion points processor 406 may be further configured to determine an unused insertion point in the host template and automatically remove the unused insertion point from the host template prior to the generation of the result electronic form. The stitching module 408 may be configured to insert a reference to the form fragment into the host template at the location indicated by the insertion point. The output module 410 may be configured to generate a result electronic form, utilizing the host template and the form fragment.

The system 400 may further include a form fragment hierarchy detector 416 to permit the use of nested fragments. A nested fragment is a form fragment that is referenced in another fragment. For example, a form fragment reference in a host form template may include an insertion point. The form fragment hierarchy detector 416 may be configured to access the form fragment associated with an insertion point in the host form template, determine a nested insertion point in the form fragment, and populate the nested insertion point with a reference to a nested fragment. The result electronic form, in this scenario, would include the form fragment, as well as the nested fragment.

An example using DDX language, shown in Table 2 below, illustrates hierarchical stitching. Specifically, in this example, a form fragment representing "Terms and conditions" includes an insertion point representing "Disclaimer."

TABLE 2

```
<XDP result="final.xdp">
    <XDP source="master.xdp"/>
    <XDP source="docin.xdp">
        <XDPContent insertionPoint="TermsAndConditions"
            source="tac.xdp" fragment="Alabama">
            <XDPContent insertionPoint="Disclaimer"
                source="disclaimer.xdp"
fragment="US"/>
        </XDPContent>
    </XDP>
    </XDPContent>
</XDP>
<XDP source="tac.xdp" fragment="Texas"/>
<XDP source="doc2.xdp"/>
</XDP>
```

Also shown in FIG. 4 is a pagination module 414. In one embodiment, the pagination module 414 may be configured to determine that pagination of the result electronic form may differ from pagination of the host template and automatically adjust page numbering in the result electronic form. The modules illustrated in FIG. 4 may be implemented as software, hardware, or a combination of both. Various operations performed by the system 400 may be discussed with reference to FIG. 5.

Figure 5:
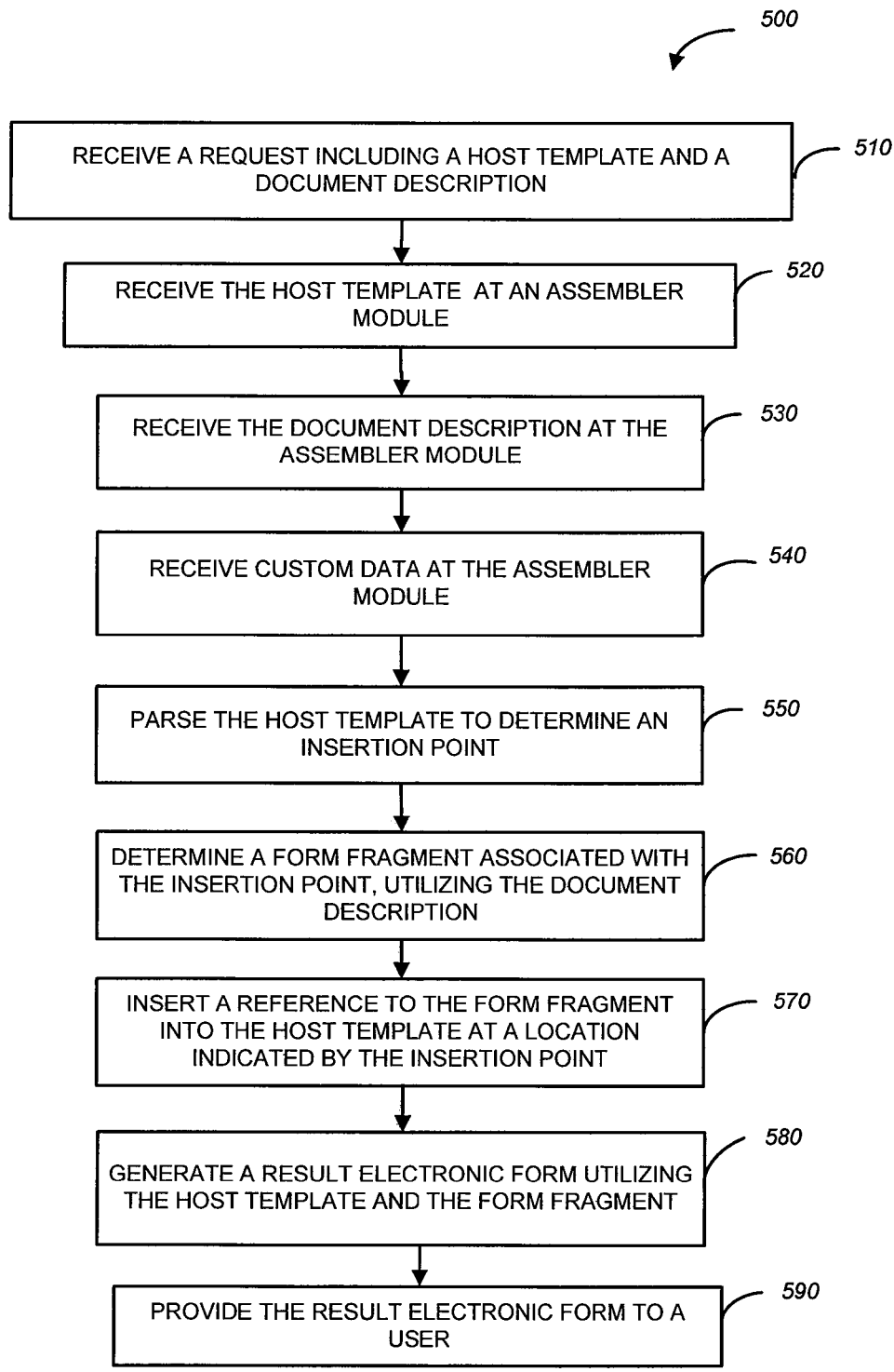
FIG. 5 is a flow chart illustrating a method for dynamic assembly of form fragments, in accordance with an example embodiment.

FIG. 5 is a flow chart illustrating a method 500 for dynamic assembly of form fragments, in accordance with an example embodiment. The method 500 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in the system for dynamic assembly of form fragments 242 shown in FIG. 2 or in any of the modules shown in FIG. 4.

As shown in FIG. 5, the method 500 commences with operation 510, where the request processor 404 of FIG. 4 receives a request to generate an electronic form based on a host template and a document description. A host template, in one example embodiment, is an electronic representation of a form that corresponds to a physical document that can be viewed and filled out by a person. The request processor 404 receives a host form template (or simply host template), a document description, and custom data at respective operations 520, 530, and 540. In some embodiments, the host template, the document description, and the custom data may be received by means of network communication. At operation 550, the insertion points processor 406 of FIG. 4 parses the host template to determine whether the host template includes an insertion point. If host template includes multiple insertion points, each of the insertion points are processed by the insertion points processor 406. At operation 560, the insertion points processor 406 determines a form fragment to be referenced by the host template at a location designated by the insertion point, based on information present in the document description. At operation 570, the insertion points processor 406 inserts a reference to the form fragment into the host template at the location indicated by the insertion point. The output module 410 of FIG. 4 generates a result electronic form, utilizing the host template and the form fragment, at operation 580. The result electronic form is provided to a user at operation 590.

Figure 6:
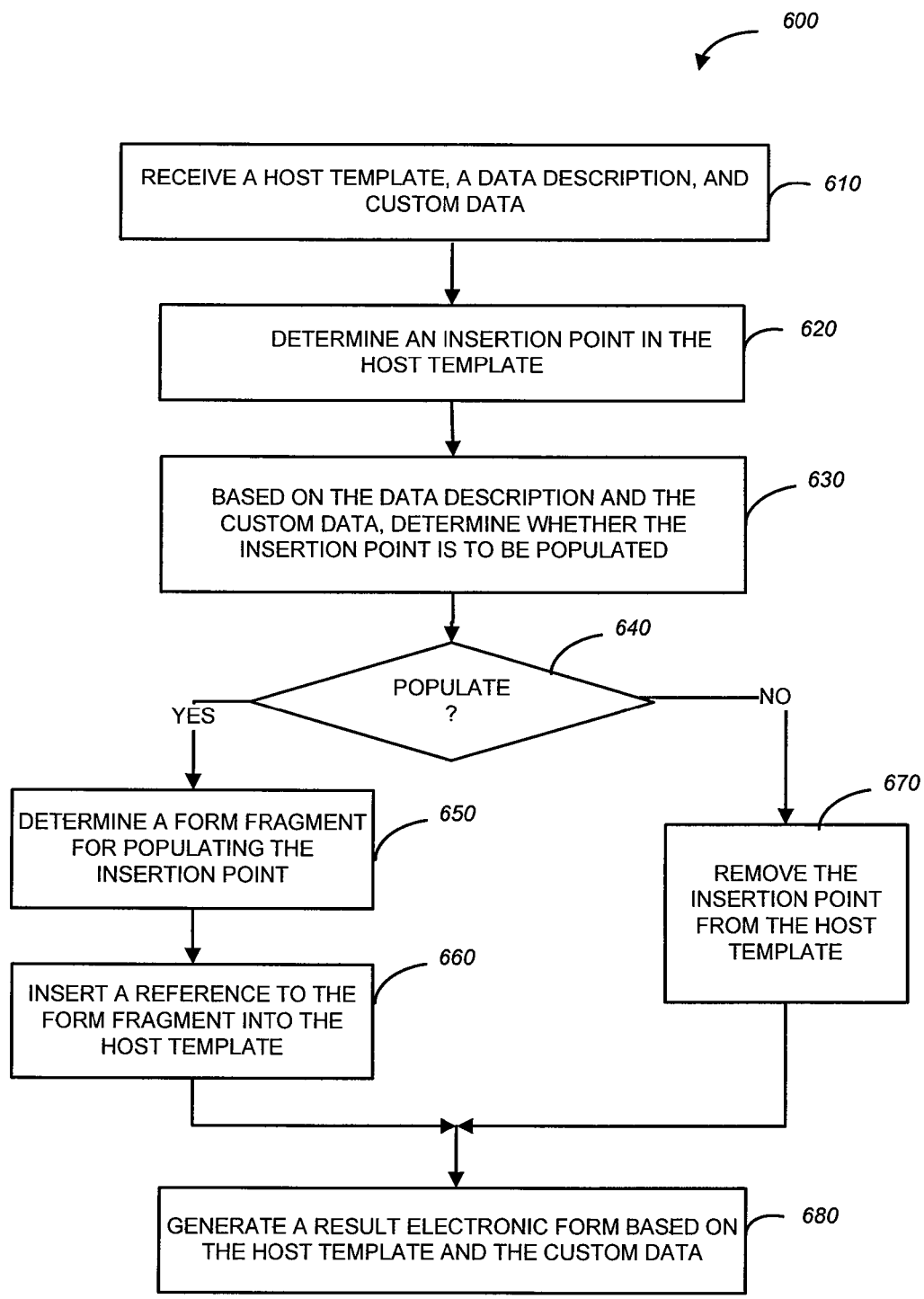
FIG. 6 is a flow chart illustrating processing unused insertion points in a host template, in accordance with an example embodiment.

FIG. 6 is a flow chart illustrating a method 600 that includes processing unused insertion points in a host template, in accordance with an example embodiment. The method 600 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in the system for dynamic assembly of form fragments 242 shown in FIG. 2 or in any of the modules shown in FIG. 4.

As shown in FIG. 6, the method 600 commences with operation 610, where the request processor 404 of FIG. 4 receives a host template, a data description and custom data. At operation 620, the insertion points processor 406 of FIG. 4 determines an insertion point in the host template and, based on the data description and the custom data, determines whether the insertion point is to be populated, at operation 630. For example, an insurance renewal form may need to include a "Risk assessment" boilerplate for some states but not for others. A host template associated with an insurance renewal form may include an insertion point for optionally including a form fragment representing "Risk assessment" boilerplate for certain states. The insertion points processor 406 may operate to determine whether such insertion point is to be populated with a reference to the form fragment representing "Risk assessment" boilerplate, based on the state for which the insurance renewal form is being prepared.

If it is determined, at operation 640, that the insertion point is to be populated, the insertion points processor 406 determines, at operation 650, a form fragment for populating the insertion point and inserts a reference to the form fragment into the host template at a location indicated by the insertion point, at operation 660. If, however, it is determined, at operation 640, that the insertion point is not to be populated, the insertion points processor 406 removes the insertion point from the host template at operation 670. The result electronic form is generated at operation 680, based on the host template that was processed by the insertion points processor 406 and the custom data.

Figure 7:
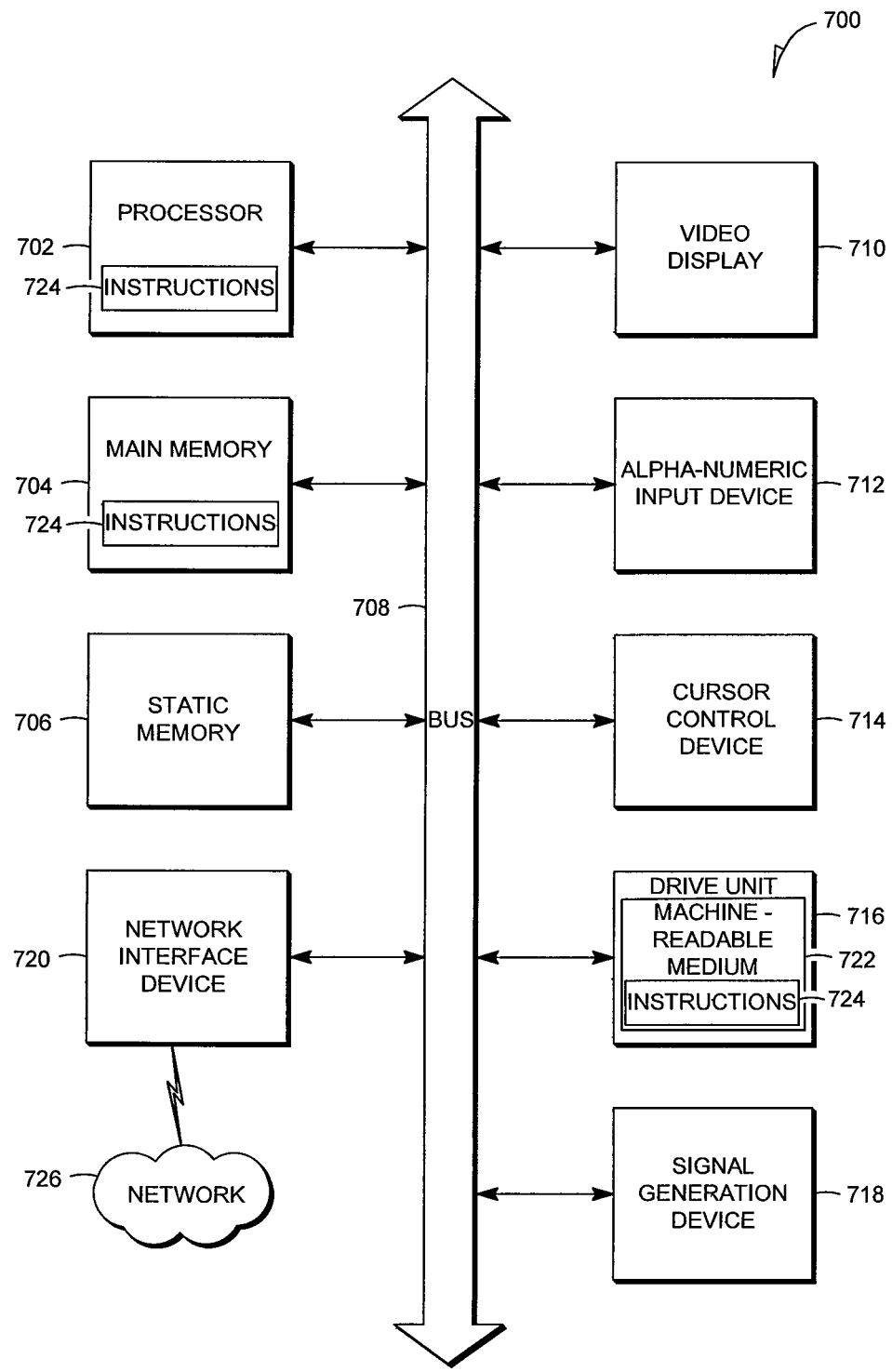
FIG. 7 is a diagrammatic representation of a machine in the example form of a computer system within which a set of instructions, for causing the machine to perform any one or more of the methodologies discussed herein, may be executed.

FIG. 7 is a diagrammatic representation of a machine in the example electronic form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) cursor control device 714 (e.g., a mouse), a disk drive unit 716, a signal generation device 718 (e.g., a speaker) and a network interface device 720.

The disk drive unit 716 includes a computer-readable (or machine-readable) medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMS), read only memory (ROMs), and the like.

In some embodiments, a various operations performed as part of a method for dynamic assembly of form fragments may comprise executing instructions on one or more specific devices. An example method may be described as follows. Instructions are executed on a first specific apparatus that result in digital electronic signal implementation of a process, in which an assembler module hosted at a computer system receives a request to generate an electronic form based on a host template and a document description. Instructions are executed on a second specific apparatus that result in digital electronic signal implementation of a process in which an insertion point processor parses the host template to determine an insertion point and determines a form fragment to be referenced in the host template at a location designated by the insertion point, based on information present in the document description. Instructions are executed on a third specific apparatus that result in digital electronic signal implementation of a process in which a stitching module inserts a reference to the form fragment into the host template at the location indicated by the insertion point. Instructions are executed on a fourth specific apparatus that result in digital electronic signal implementation of a process in which an output module generates a result electronic form, utilizing the host template and the form fragment.

Thus, method and system for dynamic assembly of form fragments have been described. In some embodiments, dynamic assembly of form fragments may permit reusing of form sections, preventing the insertion of unused form fields, and dynamically creating forms specific to each scenario now becomes practical. While some example approaches described herein may be used with ADOBE® products, the techniques described herein may be utilized beneficially with various products and that can take advantage of manipulating electronic documents in a flexible manner.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer-implemented method comprising:
receiving, at a computer system hosting an assembler module, a request to generate an electronic form based on a host template and a document description, the host template including a host form field capable of receiving input;
parsing the host template to determine an insertion point;
determining a form fragment to be referenced by the host template at a location designated by the insertion point, based on information present in the document description, the form fragment including a fragment form field capable of receiving input;
inserting a reference to the form fragment into the host template at the location indicated by the insertion point;
accessing the form fragment;
parsing the form fragment to determine a nested insertion point in the form fragment;
parsing the document description to identify a nested form fragment associated with the nested insertion point, the nested form fragment including a nested form field capable of receiving input;
inserting a reference to the nested form fragment into the host template at the location indicated by the nested insertion point; and
generating a result electronic form that includes the host form field, the nested form field from the nested form fragment, and the fragment form field.

2. The method of claim 1, comprising rendering the result electronic form for presentation to a user.

3. The method of claim 1, wherein the insertion point is one of a plurality of insertion points included in the host template.

4. The method of claim 1, comprising:
determining that pagination of the result electronic form differs from pagination of the host template; and
adjusting page numbering in the result electronic form.

5. The method of claim 1, wherein the request to generate the electronic form is associated with a workflow event.

6. The method of claim 1, wherein the document description includes a process variable that designates the form fragment.

7. The method of claim 1, comprising:
receiving custom data,
wherein the determining of the form fragment to be inserted into the host template comprises evaluating the custom data.

8. The method of claim 1, comprising:
determining an unused insertion point in the host template; and
removing the unused insertion point from the host template prior to the generation of the result electronic form.

9. A system comprising:
one or more processors configured to:
receive a request to generate an electronic form based on a host template and a document description, the host template including a host form field capable of receiving input;
parse the host template to determine an insertion point;
determine a form fragment to be referenced in the host template at a location designated by the insertion point, based on information present in the document description, the form fragment including a form field capable of receiving input;
insert a reference to the form fragment into the host template at the location indicated by the insertion point;
access the form fragment;
determine a nested insertion point in the form fragment;
determine a nested form fragment associated with the nested insertion point based on information present in the document description, the nested form fragment including a nested form field capable of receiving input;
insert a reference to the nested form fragment into the host template at the location indicated by the nested insertion point; and
generate a result electronic form that includes the host form field, the form field from the form fragment, and the nested form field from the nested form fragment.

10. The system of claim 9, wherein the output module is further configured to render the result electronic form for presentation to a user on a display device.

11. The system of claim 9, comprising a pagination module to:
determine that pagination of the result electronic form differs from pagination of the host template; and
adjust page numbering in the result electronic form.

12. The system of claim 9, wherein the request to generate the electronic form is associated with a workflow event.

13. The system of claim 9, wherein the insertion point processor is further configured to determine the form fragment based on a process variable from the document description.

14. The system of claim 9, wherein:
the request processor is further configured to receive custom data; and
the insertion point processor is further configured to determine the form fragment to be inserted into the host template based on the custom data.

15. The system of claim 9, wherein the insertion point processor is further configured to:
determine an unused insertion point in the host template; and
remove the unused insertion point from the host template prior to the generation of the result electronic form.

16. A non-transitory machine-readable storage medium comprising instructions that, when executed by one or more processors of a machine, cause the machine to perform operations comprising:
generating a host template that includes an insertion point that designates a location for inserting a form fragment that includes a form field capable of receiving input;
generating a document description that identifies the form fragment to be inserted into the host template at the location indicated by the insertion point;
detecting a workflow event indicating a request to generate an electronic form based on the host template and the document description;
parsing the host template to determine the insertion point;
determining, from the document description, the form fragment to be referenced in the host template at the location designated by the insertion point;
inserting a reference to the form fragment into the host template at the location indicated by the insertion point;
accessing the form fragment;
parsing the form fragment to determine a nested insertion point in the form fragment;
parsing the document description to identify a nested form fragment associated with the nested insertion point, the nested form fragment including a nested form field capable of receiving input;
inserting a reference to the nested form fragment into the host template at the location indicated by the nested insertion point;

generating a result electronic form, the result electronic form including the host form field, the form field from the form fragment and the nested form field from the nested form fragment; and presenting the result electronic form to a user.

17. The non-transitory machine-readable storage medium of claim 16, the operations further comprising:

determining an unused insertion point in the host template; and removing the unused insertion point from the host template prior to the generation of the result electronic form.

\* \* \* \* \*